United States Patent [19]

Feistel

[11] 3,753,140

[45] Aug. 14, 1973

[54] EQUALIZING NETWORK

[75] Inventor: Karl Heinz Feistel, Eningen, Germany

[73] Assignee: Wandel & Goltermann, Reutlingen, Germany

[22] Filed: Sept. 7, 1971

[21] Appl. No.: 178,182

[30] Foreign Application Priority Data

Sept. 9, 1970 Germany .................. P 20 44 553.8

[52] U.S. Cl. .................................. 330/109, 330/69

[51] Int. Cl. ............................................ H03f 1/36

[58] Field of Search ...................... 330/107, 109, 31, 330/69; 333/28 R

[56] References Cited

UNITED STATES PATENTS

| | | | |
|---|---|---|---|
| 3,446,996 | 5/1969 | Toffler | 333/28 X |
| 3,646,464 | 2/1972 | Boggs | 330/107 X |
| 2,623,945 | 12/1952 | Wigan | 331/141 UX |
| 2,304,545 | 12/1942 | Clement | 333/28 R |

FOREIGN PATENTS OR APPLICATIONS

| | | | |
|---|---|---|---|
| 885,849 | 12/1961 | Great Britain | 330/109 |

OTHER PUBLICATIONS

Electronic Design 25, Dec. 6, 1969 p. 103.

*Primary Examiner*—Roy Lake
*Assistant Examiner*—James B. Mullins
*Attorney*—Karl F. Ross

[57] ABSTRACT

An equalizing network for correcting phase and amplitude distortions is constructed as a four-terminal T-section with the input-side series arm and the shunt arm composed of passive impedance elements and with the output-side series arm constituted by an operational amplifier having its ungrounded output terminal connected to its inverting input terminal through a resistive feedback path. The inverting and noninverting input terminals of the amplifier are connected to the ungrounded network input through respective branches of the passive series arm. A variable capacitance forming part of a series-resonant circuit in the shunt arm, or a variable inductance forming part of a parallel-resonant circuit in one of the branches of the passive series arm, serves for selection of the frequency of maximum attenuation; the magnitude of this attenuation is controlled by an adjustable resistor in the feedback path. Selection of the phase delay is carried out with the aid of two ganged resistors in the shunt arm and in the series branch feeding the noninverting amplifier input, or by means of a single adjustable resistor common to this branch and the shunt arm.

10 Claims, 6 Drawing Figures

Karl H. Feistel
INVENTOR.

BY

Karl F. Ross
Attorney

Karl H. Feistel
INVENTOR.

BY

Karl F. Ross
Attorney

EQUALIZING NETWORK

My present invention relates to an equalizing network designed to correct phase and/or amplitude distortion in a signaling systm serving for the transmission of a broad frequency band.

In my prior U.S. Pat. No. 3,568,101 I have disclosed a four-terminal network of this general type essentially designed as an impedance bridge with two adjoining arms constituting different winding sections of an autotransformer subdivided into two subsections with an adjustable turn ratio determining the degree of attenuation to be introduced. The remaining two arms of the bridge include respectve resistors which are jointly adjustable to vary the phase shift, with maintenance of a fixed resistance ratio therebetween related to the aforementioned turn ratio. A resonant circuit in one of these latter arms is tunable for the selection of a transmission frequency for which the attenuation reaches a selected maximum value (which could be either positive or negative).

Accurate selection of the maximum attenuation or damping factor requires the use of a properly calibrated inductance as one of the subsections of the autotransformer, this inductance being preferably variable in discrete steps for greater precision. Such calibrated coils are relatively expensive to produce; moreover, the insertion of several such networks in tandem (e.g., within a transmission line to be linearized) requires the interposition of isolating amplifiers between these networks.

The general object of my present invention is to provide a simplified network of this description which, while offering almost all the operational advantages of the system disclosed and claimed in my prior patent, avoids the need for calibrated transformer windings within the network and also dispenses with active isolating stages between several such networks connected in cascade.

This object is realized, pursuant to my present invention, by designing the network as a T-secton, i.e., a pad with two series arms and a shunt arm inserted between an active input terminal, an active output terminal and a reference terminal (usually grounded) common to the input and output sides, the shunt arm and the first or input-side series arm being composed of passive impedance elements whereas the second or output-side series arm consists essentially of an operational amplifier with a noninverting input and an inverting input connected to respective branches of the first arm. This inverting input is also tied to the active output terminal via a resistive feedback path while the noninverting input is joined to the shunt arm whose other end is connected to the reference terminal. The passive impedance elements of either the shunt arm or the first series arm also include a capacitive and an inductive reactance together consitutting a resonant circuit, these reactances being connected in series if included in the shunt arm and being connected in parallel if included in the first series arm.

With such a network the same three parameters can be selectively varied as in the system of my prior patent, i.e. a resonance frequency $f_o$ or the corresponding pulsatance $\omega_o$, the attenuation or damping factor $\alpha_o$ associated with that frequency, and the related phase shift or delay time $T_o$. Frequency selection is carried out by varying one of the reactances of the resonant circuit, preferably the capacitance in the case of a series circuit and the inductance in the case of a parallel circuit. The absolute value of the maximum attenuation $\alpha_o$, which could be made either positive or negative by a switchable extension of the feedback path, can be chosen with the aid of an adjustable resistance in that path and/or in the inverting branch of the first series arm. Finally, the delay $T_o$ can be varied by means of two ganged resistors in the shunt arm and in the noninverting branch of the first series arm joined thereto, or by means of a single variable resistor bridged across part of that branch and part of the shunt arm.

Since the T-section network according to my invention incorporates an amplifier at its output side, it may be directly connected to the input side of a similar network without interposition of an active isolating stage.

The above and other features of my invention will be described in detail hereinafter with reference to the accompanying drawings in which.

Figure 1:
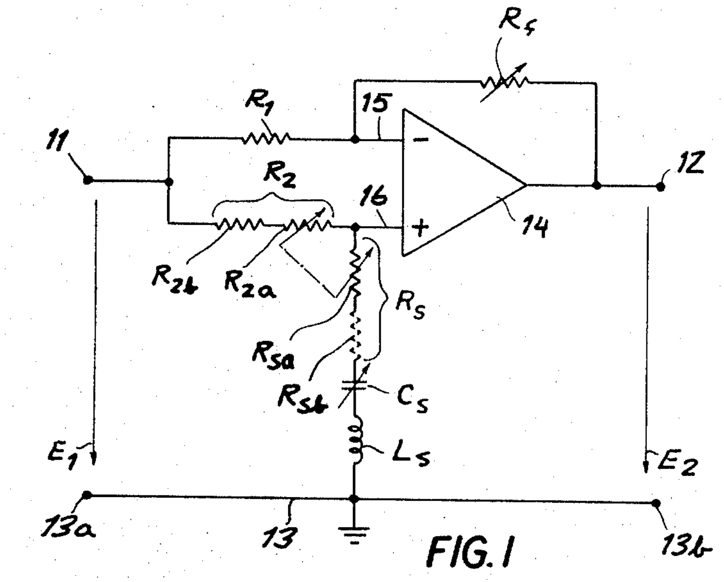
FIG. 1 is a circuit diagram of a first embodiment of my improved equalizing network.

In FIG. 1 I have shown an equalizing network embodying my invention, this network having an active input terminal 11, an active output terminal 12, and a pair of grounded terminals 13*a*, 13*b* on a common bus bar 13 serving as a reference terminal.

A first series arm of the network comprises a first resistive branch $R_1$ and a second resistive branch $R_2$connected in parallel to input terminal 11, these two branches respectively terminating at an inverting input 15 and a noninverting input 16 of an operational amplifier 14 working into the output terminal 12. Amplifier 14 has a negative-feedback path including a variable resistor $R_f$ connectd between output terminal 12 and inverting input 15. The network also has a shunt arm inserted between bus bar 13 and the noninverting amplifier input 16, this shunt arm including an inductance $L_s$, a variable capacitance $C_s$ and a resistance $R_s$ in series with one another. The operational amplifier, as is well known, has a virtually infinite input resistance and a negligible voltage difference between leads 15 and 16.

Resistance $R_s$ is split into two parts, i.e., an adjustable resistor $R_{sa}$ and a virtual resistor $R_{sb}$ in series therewith; resistor $R_{sb}$ represents the ohmic resistance of coil $L_s$. Resistance arm $R_2$ is similarly divided into an adjustble resistor $R_{2a}$, ganged with resistor $R_{sa}$, and a supplemental fixed resistor $R_{2b}$ balancing the copper losses of the coil, with $R_2/R_s = R_{2a}/R_{sa} = R_{2b}/R_{sb} = \eta$ representing the invariable ratio of the two ganged resistors.

Adopting the same symbols as in my above-identified patent, one may arbitrarily select a reference frequency $f_r$ and pulsatance $\omega_r$ defined by a parameter $f/f_r = \omega/\omega_r = \Omega$. For the resonance frequency $f_o$ of the tuned circuit $C_s$-$L_s$, $f_o/f_r = \omega_o/\omega_r = \Omega_o$.

For an input voltage $E_1$ and an output voltage $E_2$, as indicated in FIG. 1, the complex ratio $K = E_1/E_2$ is given by $$K = (\Theta^2 - 2A_N\Theta + \rho^2)/(\Theta^2 - 2A_P\Theta + \rho^2) \quad (1)$$

where $\Theta \equiv j\Omega$; in this equation, $$\rho = 1/\omega_r \sqrt{LC} = \omega_o/\omega_r \equiv \Omega_o \quad (2)$$

where $L$ and $C$ are the reactances of coil $L_s$ and condenser $C_s$, respectively.

Figure 4:
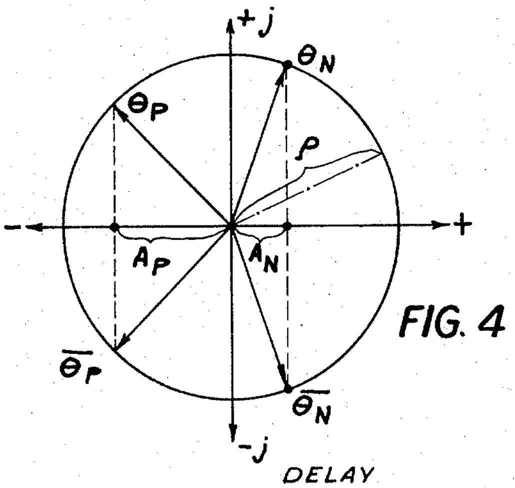
FIG. 4 is a plot of a complex variable characterizing the transmission properties of the equalizer of FIG. 1.

By separately solving the two quadratic equations in the numerator and in the denominator of equation (1), as explained in my prior patent, one obtains the poles $\Theta_P$, $\bar{\Theta}_P$ and the nodes $\Theta_N$, $\bar{\Theta}_N$ of the function $K(\Theta)$ which have been plotted in FIG. 4 where they are shown to lie on a circle of radius $\rho = |\theta_P| = |\theta_N|$.

The coefficients $A_N$ and $A_P$ in equation (1) represent the real terms of the two conjugate nodes $\Theta_N$, $\bar{\Theta}_N$, respectively, as likewise indicated in FIG. 4.

In the embodiment of FIG. 1 these coefficients are given by the following equations:

$$A_N = -\left(\eta - \frac{R_f}{R_1}\right)\frac{R_2}{2\omega_r L} \quad (3a)$$

and $$A_P = -(1+\rho)(R_2/2\Omega_r L) \quad (3b)$$

The maximum attenuation $\alpha_o$, occurring at frequency $f_o = 1/2\pi\sqrt{LC}$, is given by $$\alpha = \log\left|\frac{A_P}{A_N}\right| = \log\left|\frac{1+\eta}{\eta - \frac{R_f}{R_1}}\right| \quad (4)$$

The corresponding value $T_o$ of the delay T amounts to $$T_o = \frac{1}{\omega_r}\left(\frac{1}{A_N} - \frac{1}{A_P}\right) = \frac{2L\left(1+\frac{R_f}{R_1}\right)}{R_2(1+\eta)\left(\frac{R_f}{R_1} - \eta\right)} \quad (5)$$

Equation (4) shows that, with 92 constant, the attenuation peak $\alpha_o$ depends only on the ratio $R_f/R_1$. Thus, as illustrated in FIG. 1, feedback resistor $R_f$ is adjustable to vary the ratio $R_f/R_1$, preferably in discrete steps; the same type of adjustment can evidently be realized also by varying the magnitude of resistor $R_1$ forming with resistor $R_f$ an ohmic connection between active terminals 11 and 12.

The delay $T_o$ may be varied, as per equation (5), by adjusting resistor $R_2$ (together with resistor $R_s$ in order to keep $\rho$ constant), again preferably in discrete steps to facilitate calibration.

The supplemental series resistor $R_{2b}$, compensating the copper losses in inductance $L_s$, may be omitted if these losses are deemed insignificant.

Whereas the adjustment of resistor $R_2$ affects only the delay $T_o$, the variation of ratio $R_f/R_1$ influences both the delay and the damping factor $\alpha_o$. Thus, the latter adjustment should be carried out first, followed by a resetting of the ganged resistors $R_2$, $R_s$ to select the desired delay.

Figure 5:
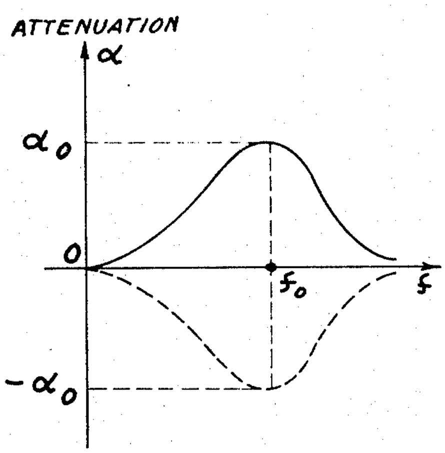
FIGS. 5 and 6 represent graphs of attenuation and phase shift plotted over a range of operating frequencies.
Figure 6:
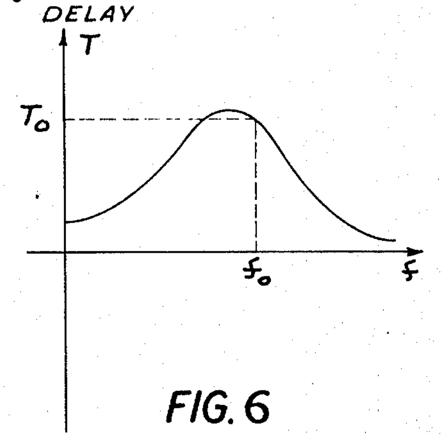

FIGS. 5 and 6 show the variation of attenuation $\alpha$ and delay $T$ with operating frequency $f$, FIG. 5 indicating the occurrence of peak $\alpha_o$ at resonance frequency $f_o$. A change of this resonance frequency by a retuning of circuit $C_s$-$L_s$ has no effect upon either of the other two parameters $\alpha_o$, $T_o$.

Figure 2:
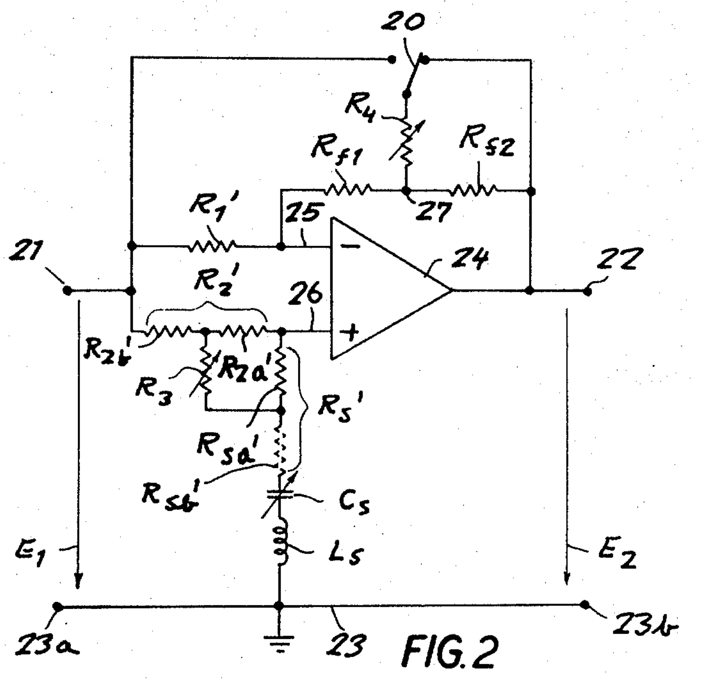
FIGS. 2 and 3 are diagrams similar to FIG. 1, showing two further embodiments.

In FIG. 2 I have shown a system generally similar to that of FIG. 1, with elements 21–26 respectively corresponding to elements 11–16 of the first embodiment. Resistors $R_{2a'}$ and $R_{2b'}$ of the first series arm $R_{2'}$ 24 and resistors $R_{sa'}$, $R_{sb'}$ of the resistive part $R_{s'}$ 24 of the shunt arm are all fixed, the change in the time factor $T_o$ being here brought about by adjustment of a variable resistor $R_3$ bridging the two serially connected resistors $R_{2a'}$ and $R_{sa'}$. This modification eliminates the need for two ganged resistors.

Another modification illustrated in FIG. 2, which could also be used in the system of FIG. 1, shows a splitting of the negative-feedback resistor into two series resistors $R_{f1}$, $R_{f2}$ whose junction is connected to an adjustable resistor $R_4$ also forming part of the ohmic connection between terminals 21 and 22. A switch 20 alternately connects the opposite end of resistor $R_4$ to output terminal 12 or to input terminal 11; in the former case, illustrated in the drawing, the attenuation $\alpha$ follows the solid curve of FIG. 5, whereas a reversal of switch 20 produces negative attenuations as illustrated by the dotted curve in that Figure. In an intermediate switch position, with resistor $R_4$ open-circuited, the circuit becomes an all-pass network with zero attenuation.

The two complementary feedback resistors $R_{f1}$, $R_{f2}$ have a ratio $\rho/(1+\rho)$ and are related to the magnitude of the resistor $R_{1'}$ in the inverting branch of the first series arm as follows:

$$R_{f1} = \rho R_{1'} \quad (6a)$$

and $$R_{f2} = (1+\rho)R_{1'} \quad (6b)$$

If we define the resistances $R_3$ and $R_4$ in terms of respective coefficients $\gamma$ and $\delta$ (the latter ranging between 0 and 1), with $R_3 = \gamma R_{2a'}$ and $$R_4 = \frac{1+\eta}{\frac{1}{\delta} - 1} R_{1'},$$

we obtain the following expressions for the coefficients $A_N$ and $A_P$ of equation (2):

$$A_N = \frac{\delta(1+\eta)}{2\omega_r L}\left(\frac{\gamma R_{2a'}}{1+\eta+\gamma} + R_{2b'}\right) \quad (7a)$$

and $$A_P = -\frac{1+\eta}{2\omega_r L}\left(\frac{\gamma R_{2a'}}{1+\eta+\gamma} + R_{2b'}\right) \quad (7b)$$

The damping factor is given as (8)

$$\alpha_o = \pm \log 1/\gamma$$

and the delay is given by $$T_0 = \frac{L\left(1+\frac{1}{\delta}\right)}{(1+\eta)\left(\frac{\gamma}{1+\eta+\gamma}R_{2a'}+R_{2b'}\right)} \quad (9)$$

In equation (8) the positive sign applies to the illustrated position of switch 20 in which the variable resistor $R_4$ shunts the feedback resistor $R_{f2}$, the negative sign relating to the opposite switch position. The limiting case $\gamma = 1$ corresponds to the open-circuiting of resistor $R_4$ by that switch.

Figure 3:
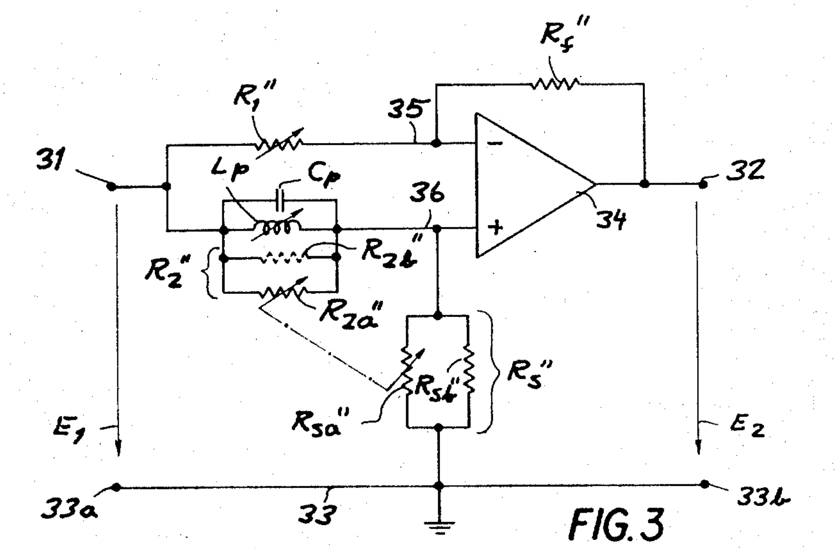

FIG. 3 shows a further embodiment in which elements 31–36 are respective counterparts of elements 11–16 and 21–26 of the preceding Figures. The ohmic connection between terminals 31 and 32 consists here of two resistors $R_{1''}$ and $R_{f''}$ similar to those of FIG. 1, the first of these resistors being here shown adjustable to vary the damping factor. The second branch of the input-side series arm comprises here a parallel-resonant circuit, consisting of a capacitance $C_p$ and an inductance $L_p$, shunted by a resistor $R_{2''}$ which is subdivided into two parallel resistors $R_{2a''}$ and $R_{2b''}$. The shunt arm $R_{s''}$ is similarly split into two parallel resistors $R_{sa''}$ and $R_{sb''}$. Resistor $R_{2b''}$ is a virtual resistance representing the shunt conductance of coil $L_p$; the relationship of these four resistors is the same as in the series circuit of FIG. 1, with $R_{s''}/R_{2''} = R_{sa''}/R_{2a''} = R_{sb''}/R_{2b''} = \mu$ ($\mu$ being a constant analogous to $\eta$). This arrangement is preferred if the leakage losses of the coil are high as compared with its copper losses.

It can be shown that the coefficients $A_N$ and $A_P$ of equation (2) have the following values in the embodiment of FIG. 3:

$$A_N = -\frac{\mu - \frac{R_f}{R_1}}{2R_{s''}\omega_r C} \quad (10a)$$

and $$A_P = -[(1+\mu)/2R_{s''}\omega_r C] \quad (10b)$$

where $C$, of course, is the capacitance of parallel condenser $C_p$. The damping factor is calculated as $$\alpha_0 = \log\left|\frac{1+\mu}{\mu - \frac{R_f}{R_1}}\right| \quad (11)$$

whereas the delay at resonance appears as $$T_0 = \frac{2R_{s''}C\left(1+\frac{R_f}{R_1}\right)}{(1+\mu)\left(\frac{R_f}{R_1}-\mu\right)} \quad (12)$$

which is analogous to equation (5).

The ohmic connection between terminals 31 and 32 could also be extended in this embodiment, in the manner shown in FIG. 2, to provide for a switchover to negative attenuations.

Selection of the desired parameters in the embodiment of FIG. 3 is analogous to that described above, with adjustment of inductance $L_p$ to alter the resonance frequency, variation of the ratio $R_{f''}/R_{1''}$ to choose the peak attenuation, and setting of the ganged resistors $R_{2a''}$, $R_{sa''}$ to establish the desired delay. Again, these ganged resistors may be replaced by a common variable shunt resistor, such as the impedance $R_3$ in FIG. 2.

It is to be understood that my invention is not limited to networks with impedances variable continuously or in steps, as shown and described, but that the magnitudes of these impedances could also be fixed, as by interconnecting certain tabs thereon with soldered connections which may be removed or relocated for purposes of readjustment.

The equalizing network according to my invention is capable of performing all the tasks of the system of my prior U.S. Pat. No. 3,568,101, except operation with minimum phase shift and negative attenuation as described in connection with curve T′ (FIGS. 10 and 11) of that patent. As compared with that earlier system, its structure is considerably simplified.

I claim:

1. An equalizing network comprising a T-section with a reference terminal, an active input terminal and an active output terminal, a first and a second series arm connected in tandem between said active input terminal and said active output terminal, and a shunt arm connected at one end to said reference terminal; said first series arm and said shunt arm being composed of passive impedance elements; said second series arm consisting essentially of an operational amplifier with a noninverting input and an inverting input, said amplifier being provided with a resistive feedback path between said active output terminal and said inverting input; said first series arm being divided into a first branch terminating at said inverting input and a second branch terminating at said noninverting input, the latter input being connected to the other end of said shunt arm; said passive inpedance elements including a capacitive reactance and an inductive reactance together constituting a resonant circuit; said passive impedance elements further including an ohmic portion of said second branch and an ohmic portion of said shunt arm jointly variable with maintenance of a fixed resistance ratio $\eta$, one of said ohmic portions being in circuit with said inductive reactance, the other of said ohmic portions being in circuit with a fixed supplemental resistor compensating an ohmic component of said inductive reactance with the same ratio $\eta$.

2. A network as defined in claim 1 wherein one of said reactances is adjustable for selecting a frequency of maximum absolute value of the attenuation of the network.

3. A network as defined in claim 2 wherein said reactances are connected in series in said shunt aim, said adjustable reactance being a capacitance.

4. A network as defined in claim 2 wherein said reactances are connected in parallel in one of said branches, said adjustable reactance being an inductance.

5. A network as defined in claim 4 wherein said one of said branches is said second branch.

6. A network as defined in claim 1 wherein said jointly variable ohmic portions comprise a pair of ganged resistors in said second branch and in said shunt arm.

7. A network as defined in claim 1 wherein said variable resistive means comprises a resistor bridged across part of said second branch and part of said shunt arm.

8. A network as defined in claim 1 wherein said feedback path and said first branch form an ohmic circuit including an adjustable resistance for selecting the magnitude of the maximum absolute attenuation of the network.

9. A network as defined in claim 8 wherein said feedback path includes a pair of series resistors and switchover means for selectively connecting said adjustable resistance between either of said active terminals and the junction of said series resistors.

10. A network as defined in claim 9 wherein said series resistors bear a ratio of $\rho : (1+\rho)$.

* * * * *